United States Patent [19]

Moransais

[11] Patent Number: 4,830,329

[45] Date of Patent: May 16, 1989

[54] DEVICE FOR THE MANUFACTURE OF ELLIPTICAL PICKUP DIAMONDS

[75] Inventor: Charles Moransais, L'Ormaie - Perouges - Ain, France

[73] Assignee: Zafira, France

[21] Appl. No.: 46,839

[22] Filed: May 5, 1987

[51] Int. Cl.<sup>4</sup> .................. B29C 39/26; B29C 45/14
[52] U.S. Cl. ........................ 249/83; 249/160; 425/117; 425/127; 425/129.1; 425/542
[58] Field of Search ............ 425/110, 116, 117, 127, 425/128, 129 R, 406, 129.1, 542; 249/83, 85, 90; 264/275

[56] References Cited

U.S. PATENT DOCUMENTS

| | | | |
|---|---|---|---|
| 3,227,416 | 1/1966 | Fessel | 425/128 |
| 3,685,935 | 8/1972 | Kurucz et al. | 425/116 |
| 4,165,560 | 8/1979 | Matsumoto | 369/173 |
| 4,219,199 | 8/1980 | Okuda | 369/173 |
| 4,263,005 | 4/1981 | Shinozaki | 425/117 |
| 4,365,325 | 12/1982 | Vandenhul | 369/173 |
| 4,708,613 | 11/1987 | Sera et al. | 425/129 R |

Primary Examiner—Willard Hoag
Attorney, Agent, or Firm—Harry M. Weiss

[57] ABSTRACT

The present invention concerns the manufacture of a support arm equipped with a diamond pickup of the type utilized for a record turntable pickup. The diamond pickup has a cylindrical central body having a plurality of planar facets and an elliptical tapered point.

The support arm is injection molded in a mold consisting of an upper and lower die. The upper mold die has a V-shaped notch in which the planar facets of the cylindrical central body is automatically positioned under the thrust of the injected composite material.

1 Claim, 3 Drawing Sheets

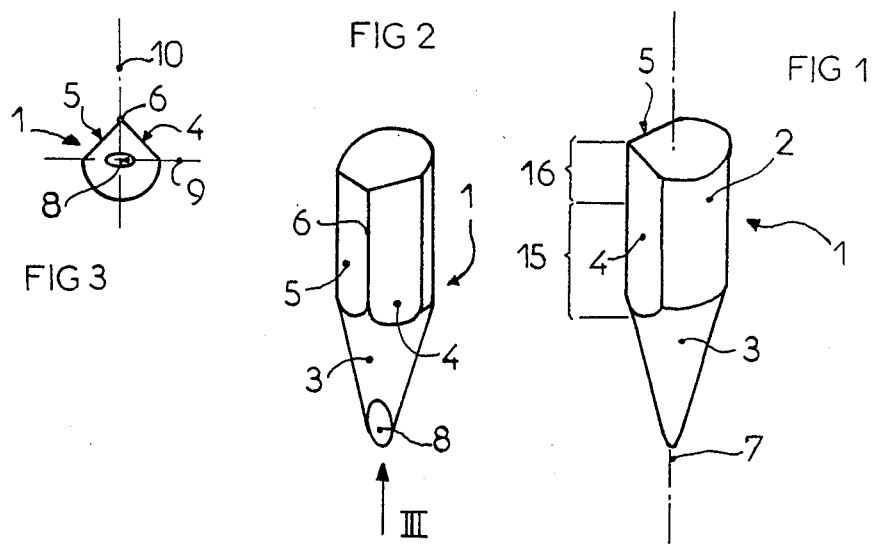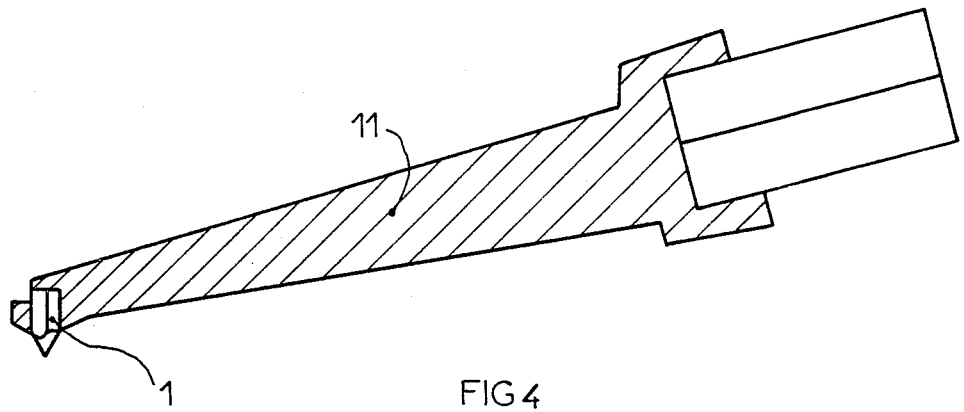

DEVICE FOR THE MANUFACTURE OF ELLIPTICAL PICKUP DIAMONDS

BACKGROUND OF THE INVENTION

The present invention relates to a novel process and device for manufacturing a new type of diamond of the type used in the electronics industry in, for example, a turntable pickup.

It is known that a diamond pickup of the type used for turntables, comes in the shape of a cylinder of small size (for example, 2 to 3 mm in length and 0,0.25 mm in diameter), ending in a cone-shaped point. This solid is usually made of a material such as an industrial diamond. The diamond is then incorporated into a support arm to be attached to a pickup in an interchangeable manner. The cone-shaped point of the diamond is then positioned vertically in, and tracks with, the groove of a record.

Most pickup diamonds of this type have a cylindrically conical rotational shape, i.e., the theoretical transverse sections all have a circular shape.

Research has demonstrated that the quality of sound reproduction would be improved by providing elongated transverse sections to the cone-shaped point of the pickup, i.e., substantially elliptical in shape. It is desirable, therefore, to position the point of the diamond in such a manner that the major axis of the ellipses of its point are positioned transversely with respect to the playing direction of the record grooves. In use, there are substantial practical difficulties which stem from the extremely small size of the diamonds used and the difficulty and lack of feasibility of manufacture of such diamonds at acceptable industrial production rates.

SUMMARY OF THE INVENTION

Accordingly, it is a goal of the present invention to avoid these aforementioned disadvantages and drawbacks by producing a diamond with a substantially elliptical cone-shaped point which is automatically positioned and incorporated into a support arm, which may be manufactured at an acceptable industrial production rate.

A pickup diamond according to the present invention has a cylindrical rotational body with a tapered point at one end and is characterized by the tapered point having, at its extremity, an elongated, nearly elliptical transverse section. In other respects the cylindrical body has at least one facet parallel to its geometric axis, the orientation of which is well-defined with respect to that of the major axis of the elliptical transverse sections of the point.

According to another characteristic of the present invention, the cylindrical body has two longitudinal plane facets. The intersection of the two longitudinal plane facets defines the edge of a dihedral, the diametral plane corresponding to that edge being substantially perpendicular to the diametral plane containing the major axis of the elliptical sections of the point.

According to another characteristic of the present invention, the device for manufacturing a support arm by duplicate molding or casting of material around the diamond includes an injection mold whose lower die has a cone-shaped impression corresponding to the point of the diamond. The upper die has facets complementary in shape and arrangement to those of the cylindrical body of the diamond. The facets of the upper die abut the facets of the cylindrical body of the diamond when the mold is closed, so that when the diamond is positioned in the mold by its upper facetted end and its lower cone-shaped end, empty space remains around its central part into which the material to be molded can be injected. The pressure of the injection material typically has a tendency to push the diamond against the stops, which, by way of lower and upper parts of the diamond, position it not only in the vertical direction, but also around its vertical geometrical axis.

According to another characteristic of the present invention, a support arm produced in such a manner is characterized by being in the form of an arm made of a composite material, which is directly cast around the diamond having the lower cone-shaped end having an elongated, substantially elliptical transverse section, the major axis of which is automatically positioned in a precise manner, with respect to the longitudinal axis of the plastic arm.

The appended drawings, furnished as a non-restrictive example, will enable a better understanding of the characteristics of the invention.

BRIEF DESCRIPTION OF THE DRAWINGS

FIGS. 1 and 2 are perspective views of a pickup diamond according to the present invention.

FIG. 3 is a planar view taken along line 3—3 of FIG. 2.

FIG. 4 is a longitudinal section of a support arm according to the present invention made by casting around a diamond with an elliptical point, made of plastic or any composite material.

DESCRIPTION OF THE PREFERRED EMBODIMENTS

Figure 5:
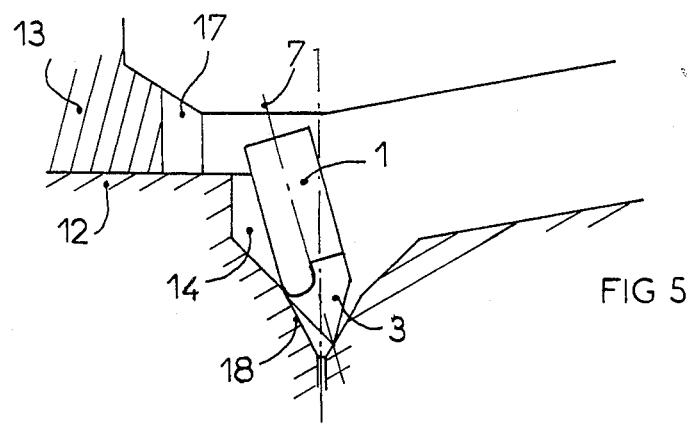
FIG. 5 is a vertical section showing a diamond with an elliptical point according to the invention, which is introduced into the empty mold.

A diamond pickup having an elliptical point according to the present invention is cut, in one piece, from an industrial diamond. The diamond pickup is in the form of a cylindrical rotational body 2, which ends in a lower cone-shaped point 3. Two longitudinal facets 4, 5 are cut on the cylindrical body 2. According to the preferred embodiment, longitudinal facets 4, 5 are substantially perpendicular with respect to each other, the intersection of which defines edge 6 of a dihedral. Edge 6 is substantially parallel to the longitudinal geometrical axis 7 of the diamond 1.

Cone-shaped point 3 of the diamond 1 has an elongated, elliptical transverse section 8 at least at one end thereof. Cone-shaped point 3 having the elliptical transverse section 8 is obtained, for example, by cutting oblique facets on a cone-shaped rotational point. It is desirable, however, that elliptical point 8 be cut at the same time as facets 4, 5 to insure correct positioning therewith.

In the illustrated examples, the direction of the major geometrical axis 9 of the elliptical transverse section 8 is perpendicular to the diametral plane 10 of diamond 1, which bisects the dihedral defined by the facets 4 and 5.

According to the present invention, the diamond pickup 1 is then incorporated into a support arm 11 by injection molding and casting of a plastic material. This casting or duplicate molding is performed in a mold consisting of a lower die 12 and an upper die 13. Lower die 12 has a concave tapered impression 18, the contour of which is complementary to that of point 3 of the diamond 1 which it receives. Above and around tapered impression 18 is a generally V-shaped notch 17, the facets of which receive facets 4 and 5 of the diamond 1, and which serve to abut the upper part 16 of the diamond 1. Below V-shaped notch 17, an empty space 14 surrounds the center part 15 of the diamond 1.

When the upper and lower die, 12 and 13, of the mold are open, a diamond 1 is introduced into the impression. Gravity then causes the cone-shaped point 3 of the diamond to be positioned within impression 18. This positioning, however, is only approximate.

Figure 7:
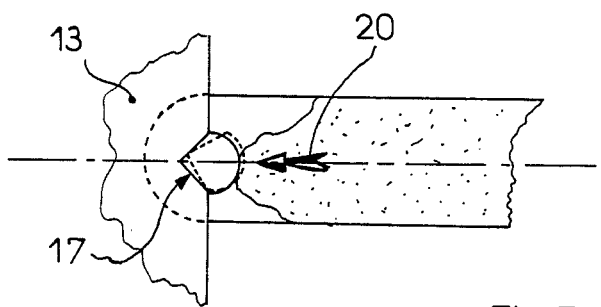
FIG. 7 is a plan view corresponding to FIG. 6.
Figure 8:
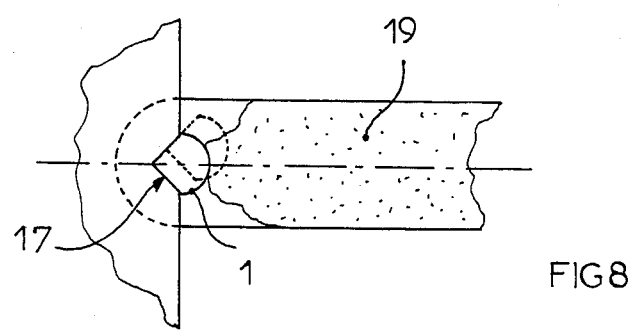
FIG. 8 is a plan view showing the automatic positioning of the diamond in the mold by pressure injection of the composite material.
Figure 6:
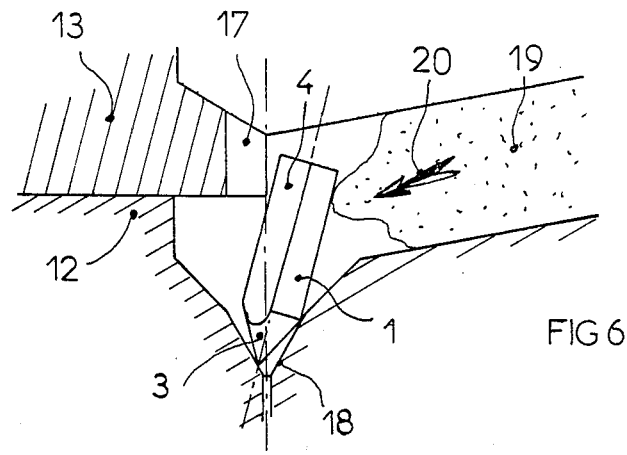
FIG. 6 is a vertical section showing a diamond with an elliptical point according to the present invention, showing injection of the plastic material into the closed mold.
Figure 9:
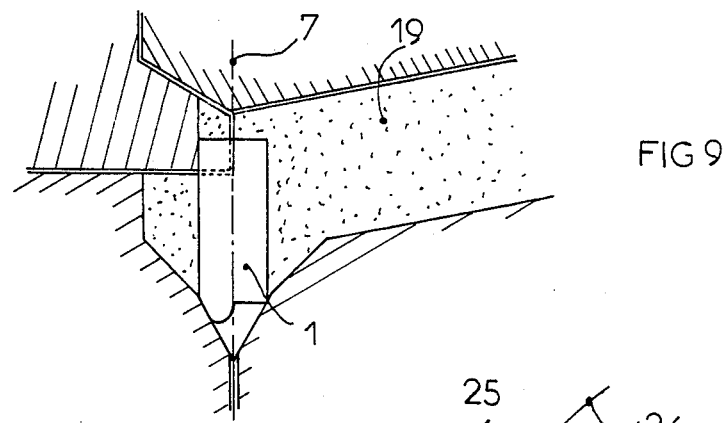
FIG. 9 is a vertical sectional view corresponding to FIG. 6, after the injection of the composite material.

When the mold is closed, the V-shaped notch 17 of the upper die is properly positioned for alignment of the diamond pickup 1 as shown in FIGS. 6–9. Injection is then performed by introduced the molten plastic or composite material 19 into the mold impression. The pressure of injection exerts a thrust on diamond 1, in a generally longitudinal direction as indicated by arrow 20 of FIG. 6. As a result of this thrust, the lower point 3 is centered in impression 18 and the upper part 16 of facets 4 and 5 are aligned in V-shaped notch 17. It is to be noted, as depicted by FIGS. 7–8, that the centering of the thrust properly positions the diamond even if the diamond's angular orientation is faulty, or if its positioned off center with respect to the tapered impression 18 of the V-shaped notch 17.

After injection, the plastic material 19 has filled space 14, coated the center part 15 of the diamond 1, diamond 1 is precisely positioned in all directions, and is properly positioned around its longitudinal axis 7.

When the resulting unit of the diamond 1 and arm 11 are removed from the mold after solidification of the plastic or composite material 19, the diamond 1 and its elliptical point is correctly positioned with respect to the support arm 11. Support arm 11, equipped with the elliptical diamond 1 can then be adapted in the conventional manner to any pick up, for example, for use with a record turntable.

Figure 10:
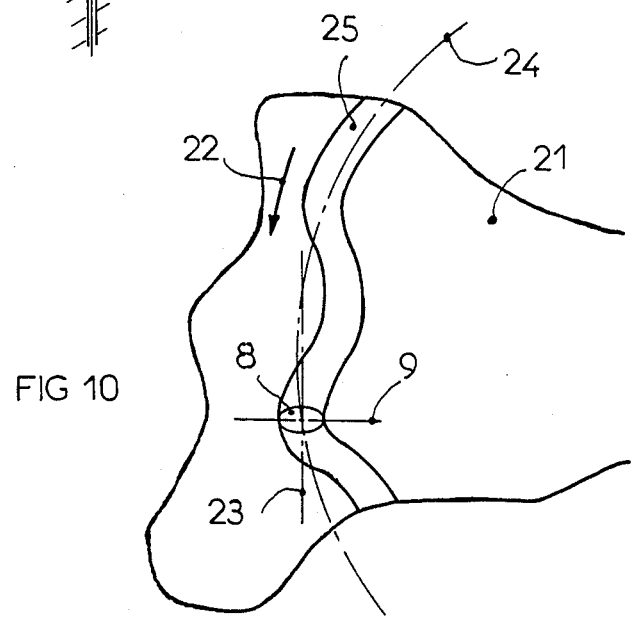
FIG. 10 is a top elevational view of a record groove showing the diamond pickup according to the present invention tracking therein.

It will be understood, by those skilled in the art, that the invention may be implemented at acceptable industrial production rates, while guaranteeing a high degree of precision in the final positioning of the diamond 1. As is illustrated by FIG. 10, the elliptical section 8 of the diamond 1, according to the present invention, is positioned in a micro-grove 25 of a record 21 during operation. As groove 25 spins, depicted by arrow 22, the major axis 9 of the elliptical point 8 remains positioned perpendicular to the tangent 23 of the mean circular movement 24 of the micro-groove 25. Due to the elliptical shape and correct positioning, the length of the friction zone of the elliptical point 3 of the diamond of the present invention is reduced from seventeen microns, noted with conventional cone-shaped diamond pickups, to about five microns. This reduction in the friction zone of the diamond pickup substantially improves sound quality while reducing record wear.

I claim:

1. An apparatus for manufacturing a diamond pickup support arm wherein the diamond pickup comprises a cylindrical rotational body having a tapered point at one end thereof, said tapered point further comprising an elongated member having a substantially elliptical transverse cross-section, said cylindrical rotational body further comprising at least one faceted surface parallel to a geometrical axis of said cylindrical rotational body, said at least one faceted surface having a defined orientation with respect to a major axis of said elliptical transverse cross-section of said tapered point and the apparatus for manufacturing the diamond pickup support arm comprises an injection mold having an upper and lower die thereof, said lower die further defining a cone-shaped impression therein having a shape corresponding to said tapered point of said diamond pickup, said upper die further comprising a generally V-shaped notch having a plurality of facets, each of which further has a shape and arrangement complementary to said at least one faceted surface of said cylindrical body of said diamond pickup, said V-shaped notch abutting said at least one faceted surface of said cylindrical body of said diamond pickup, when said injection mold is closed, thereby positioning said diamond pickup in said injecton mold such that said at least one faceted surface contacts surfaces defining said V-shaped notch of said upper die and said tapered point of said cylindrical body contacts surfaces defining said impression of said lower die and an empty space, into which a material to be injected, surrounds a central portion of said cylindrical body, wherein said material to be injected imparts a pushing force against said diamond pickup thereby positioning said diamond pickup with respect to said V-shaped notch and said impression.

* * * * *